United States Patent
Maffei

(10) Patent No.: US 6,609,635 B1
(45) Date of Patent: Aug. 26, 2003

(54) DEVICE FOR DRAWING AND DISPENSING LIQUID FROM A BOTTLE WITH A CYLINDER AND PISTON ASSEMBLY ASSOCIATED WITH THE STOPPER OF THE BOTTLE

(75) Inventor: Camilla Maffei, Pistoia (IT)

(73) Assignee: Project S.a.s. di Massimo Menichelli & C. (IT)

( * ) Notice: Subject to any disclaimer, the term of this patent is extended or adjusted under 35 U.S.C. 154(b) by 0 days.

(21) Appl. No.: 09/868,427

(22) PCT Filed: Dec. 13, 1999

(86) PCT No.: PCT/IT99/00408

§ 371 (c)(1),
(2), (4) Date: Jun. 15, 2001

(87) PCT Pub. No.: WO00/37896

PCT Pub. Date: Jun. 29, 2000

(30) Foreign Application Priority Data

Dec. 18, 1998 (IT) ............................................ FI98A0274

(51) Int. Cl.⁷ ................................................ B67D 5/22
(52) U.S. Cl. .......................... 222/39; 222/50; 222/309
(58) Field of Search .............................. 222/43, 309, 50, 222/39, 44, 47, 49, 386; 116/286

(56) References Cited

U.S. PATENT DOCUMENTS

| 1,352,270 | A | | 9/1920 | Jefferson |
| 3,094,245 | A | * | 6/1963 | Mizuno ...................... 222/309 |
| 3,248,950 | A | * | 5/1966 | Pursell et al. ............... 222/309 |
| 3,283,727 | A | * | 11/1966 | Rodrigues, Jr. ............. 222/309 |
| 3,934,586 | A | * | 1/1976 | Easton et al. ................. 222/47 |
| 4,074,831 | A | * | 2/1978 | Roach ......................... 222/309 |
| 4,492,317 | A | * | 1/1985 | Guess et al. ................. 222/39 |
| 4,964,534 | A | * | 10/1990 | Strazdins .................... 222/309 |
| 5,836,359 | A | * | 11/1998 | Seidler ......................... 141/23 |
| 6,164,497 | A | * | 12/2000 | Chia et al. ................... 222/309 |

FOREIGN PATENT DOCUMENTS

| DE | 497 513 | 5/1930 |
| DE | 41 34 911 A1 | 4/1993 |
| EP | 0 723 921 A2 | 7/1996 |
| FR | 2 231 955 | 12/1974 |

* cited by examiner

Primary Examiner—Joseph A. Kaufman
(74) Attorney, Agent, or Firm—McGlew and Tuttle, P.C.

(57) ABSTRACT

The stem (9) of the piston (7) has a series of impressions in indented (12) or relief form, permitting the tactile perception, even by persons without sight, of the position of the piston with respect to the cylinder. The impressions (12) being able to interact with one or more tongues (16, 16A) formed in the stopper.

11 Claims, 2 Drawing Sheets

DEVICE FOR DRAWING AND DISPENSING LIQUID FROM A BOTTLE WITH A CYLINDER AND PISTON ASSEMBLY ASSOCIATED WITH THE STOPPER OF THE BOTTLE

FIELD AND BACKGROUND OF THE INVENTION

There are known devices for drawing small quantities of liquid from bottles, which are called cylinder and piston droppers and which are also frequently combined directly with the stoppers of bottles.

SUMMARY AND OBJECTS OF THE INVENTION

The invention relates to an improved embodiment of these types of dropper devices, to achieve particular objects and advantages which will be made clear by the following text. In particular, by using the device according to the invention it is possible to enable even sightless persons to perceive the quantity of liquid sucked up by the cylinder and piston (in other words, syringe) system, or dispensed by said system. Advantages with respect to construction and assembly are also obtained, together with easier handling and possible elimination of components, such as rubber or other, which may cause a risk of contamination.

This device for drawing liquid from a bottle characteristically has in the stem a series of impressions—in indented or relief form—which permit tactile perception and in certain cases permit the perception of the position of the piston with respect to the cylinder even by persons without sight.

Said impressions may also interact with at least one elastic tongue formed in the stopper, which clicks whenever an impression moves past, both during the stroke in the suction phase and during the reverse stroke in the dispensing phase. In this way it is possible to also provide auditory perception for persons without sight.

The device may comprise a plurality of elastic tongues distributed around the stem of the piston, which facilitates the insertion of the piston into the cylinder through the stopper. The insertion of the piston into the stopper is also facilitated by a conical funnel-shaped profile. The piston may be formed by molding from the same material as the stem. The possibility of inserting the stem and the piston means that the operator's end of the piston stem can be developed with an expansion which facilitates the grasping and operation of the piston.

The inner end of the stem may have an extension, forming an auxiliary stopper capable of interacting with a seat formed for it in the base of the cylinder, to seal the seat when the bottle is in the closed condition.

The elastic tongue or tongues can be formed in an extension of the stopper in the form of a sleeve which surrounds the stem of the piston.

The invention will be more clearly understood from the description and the attached drawing, which shows a non-restrictive practical example of the invention.

DESCRIPTION OF THE PREFERRED EMBODIMENT

Figure 1:
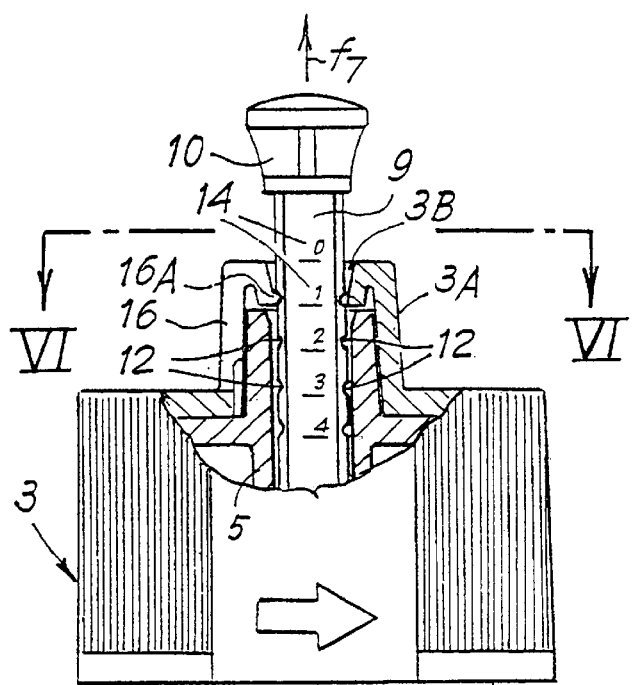
FIG. 1 shows a first embodiment, in a side view in partial axial section.

According to the illustrations in the attached drawing, with reference to the first embodiment, the numeral 1 indicates the bottle from which the drawing of the liquid is to be made possible by a cylinder and piston system connected to the stopper indicated in a general way by 3; this stopper can be of the type which is simply screwed on, or of the type called "childproof", in other words one having a safety device to permit opening only by specific operations which are not easily carried out by a child. In any case, the stopper 3 or the inner part thereof is integral with, or made integral with, a cylinder 5 which reaches the base 1A of the container 1 for drawing the liquid by means of a piston which is indicated by 7 and which is integral with a stem 9 extending coaxially with the cylinder 5 and projecting above the stopper 3 with a knob 10.

Figure 6:
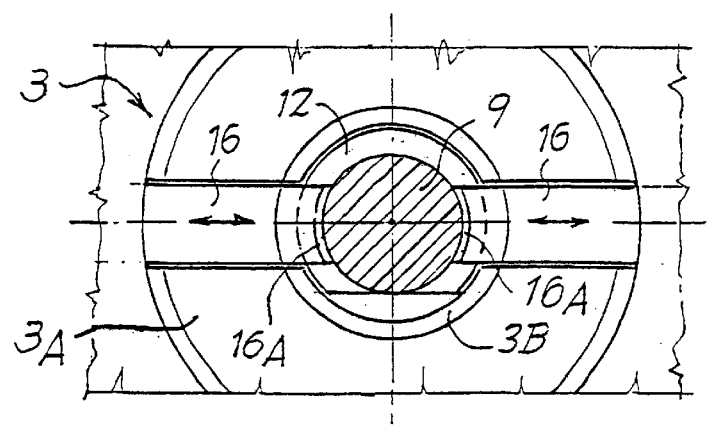
FIG. 6 shows a section through the sleeve of FIG. 1, with two tongues engaged.

According to the invention, and according to said first embodiment, the stem 9 has at least one series of impressions 12 in the form of annular indentations, which can be associated with visual indications in the form of a graduated scale 14 corresponding to the series of impressions 12. The indented impressions 12 interact with the movable ends 16A of at least two elastic tongues 16 (FIGS. 1 and 6) which can be formed in a truncated conical sleeve 3A formed from the stopper 3 and surrounding the stem 9 of the piston 7. When at least two tongues are used, even if one of them is next to the flat silk-screened part of the scale, the other is engaged; this means that it is not necessary to position the stem 9 with respect to the stopper during assembly and use (with the sliding movements).

The sleeve 3A has an external funnel-shaped profile with a truncated conical wall 3B; the plurality of tongues 16 together with the conical part 3B make it easy to insert the stem 9 of the piston and the piston 7 itself, which can be formed with the stem or fixed to the stem 9, which is inserted into the funnel-shaped profile 3B formed by the sleeve 3A and delimited at least partially by the elastic tongues 16. The insertion of the stem 9 and of the piston 7 is thus carried out after the stopper 3 has been fitted to the inner cylinder 5. It is possible to make the piston 7 from the same material and by the same synthetic resin molding process as the stem 9 and its operating knob 10; in this case, the piston 7 can advantageously be formed—as shown in the drawing—by a series of annular projections 7A of sawtooth section, which have relatively flexible tips; to increase any elastic yieldingness, the piston 7 may be shaped with an axial recess 7B which enables the piston 7 to be formed with greater possibility of flexion.

Figure 2:
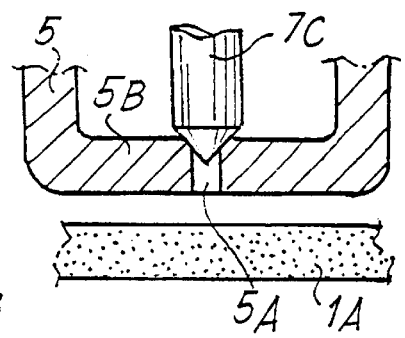
FIG. 2 shows an enlarged detail of FIG. 1, indicated by the arrow II.
Figure 3:
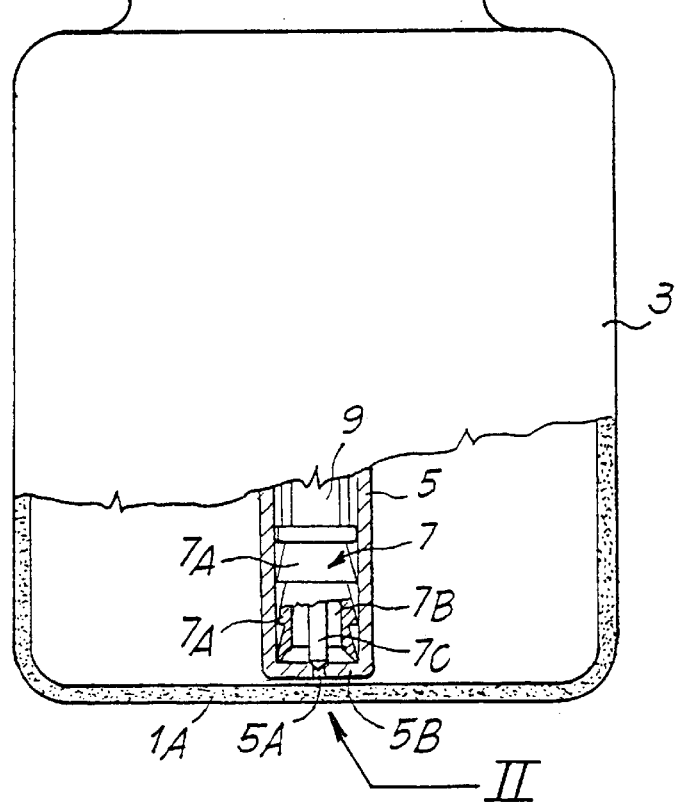
FIG. 3 shows a variant of FIG. 2.
Figure 3:
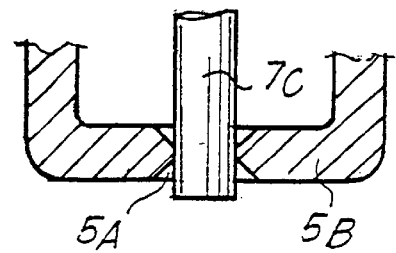

To ensure the tightness of the piston, even and especially while it is at rest and during handling with the bottle closed, it is possible to provide an extension 7C which originates inside the recess 7B of the piston or in any case originates coaxially with the piston 7 to interact with a passage 5A formed in the base 5B of the cylinder 5, to ensure tightness in the conditions of maximum lowering of the piston 7 inside the cylinder 5. FIGS. 2 and 3 show two solutions; that in FIG. 3 requires a lower degree of precision. When the piston 7 starts to move in the direction of the arrow f7 (upward in terms of the drawing) to carry out the suction operation, the end of the extension 7C is lifted from the hole 5A permitting communication between the container 1 and the chamber of the lower part of the cylinder 5 below the piston. The piston, sliding in the direction of the arrow f7, sucks the liquid into the cylinder 5. With this movement of the piston in the direction f7, the knob 10 being grasped, the elastic end 16A of the tongue 16 or of each of the tongues 16, interacting with the series of indented impressions 12 or one of them, passes successively from one to another of said impressions 12, thus providing an indication of the travel imparted to the piston 7 and thus a tactile and auditory perception of the position of the piston with respect to the cylinder, even by persons without sight, and thus a perception of the quantity of liquid which has been sucked up by the operation of moving the piston 7 in the direction of the arrow f7 with respect to the cylinder 5. Tactile perception can also be obtained by sliding a finger-tip along the part of the stem 9 which the suction operation causes to project outside the stopper 3 and the sleeve 3A; this provides a further possibility of perception, independent of that due to the clicks of the tongue or tongues 16, 16A.

As shown in the drawing, the central hole of the sleeve 3A for the passage of the stem 9 is developed with the funnel-shaped profile indicated by 3B, this funnel-shaped profile being at least partially delimited by a corresponding shaping of the elastic tongue or tongues 16, 16A formed from said sleeve 3A. This arrangement makes it possible to insert the stem 9 with the piston 7 in an operation of assembly from the outside of the stopper 3. This also makes it possible to form the handle 10 with a larger transverse dimension than that which has been achieved up to the present time with the arrangement by which the stem of the piston is inserted before the fitting of the stopper, which makes it necessary not to have a sufficiently large projection of the end of the piston stem which is to be made graspable by the fingers for the movement of the piston by means of its stem. With the arrangement according to the invention, this operation is facilitated by the dimensioning of the knob 10 which can exceed the maximum external dimensions determined by the size of the cylinder 5 and of the members facing the stem of the piston, by contrast with what would be necessary in existing solutions. It is also possible to shape the cylinder 5 with the base 5B and the hole 5A to provide a seal by the extension 7C.

By forming the piston 7 in one piece with the stem, and therefore in synthetic resin which is more or less flexible but without the use of rubber, the advantage is obtained of avoiding the presence of a resilient material such as rubber in continuous contact with the liquid contained in the container or bottle 1, this liquid being subject to possible contamination by contact with rubber. The forming of the piston 7 with a plurality of annular projections 7A to form a seal with the inner surface of the cylinder 5 makes it possible to provide sufficient tightness between the cylinder and piston, without making use of rubber. Furthermore, by making the operating extension 7C with a profile corresponding to the hole 5A in the base 5B of the cylinder, the content of the bottle can be kept completely isolated from the lower space of the cylinder 5, precisely by the presence of the extension 7C which forms a stopper bearing on the seat created by the passage 5A.

Figure 4:
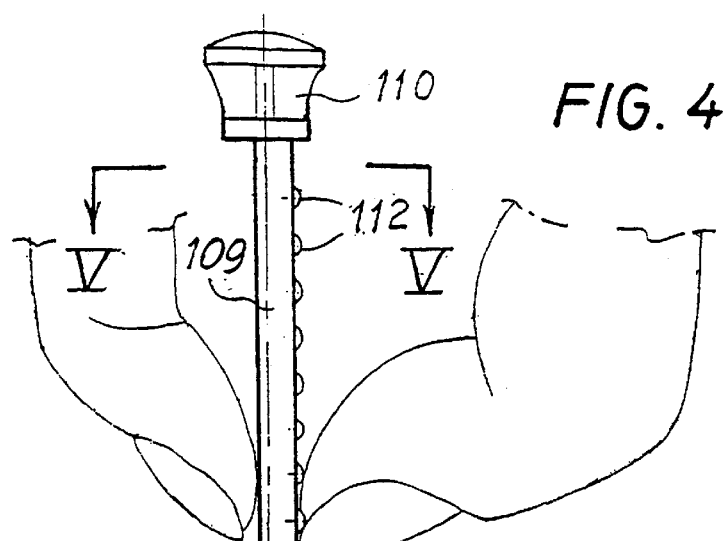
FIG. 4 shows a variant of the embodiment of FIG. 1.
Figure 5:
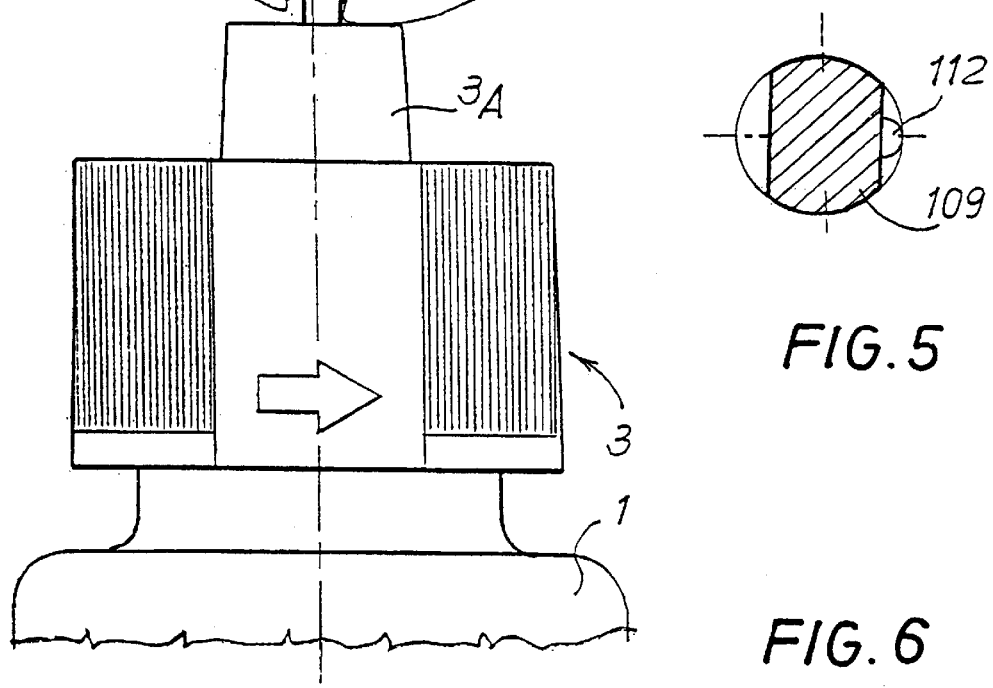
FIG. 5 shows a cross section of the stem of FIG. 4.

In the modified embodiment illustrated in FIG. 4, a simple variation of the formation of the impressions on the stem of the piston is provided, in that the stem 109—equivalent to the stem 9 of the preceding example—has its impressions 112 in relief rather than indented, although still formed within an external profile of circular section, in order to avoid problems of assembly; both the interaction with the elastic end of a tongue similar to the tongue 16A, which interacts with the projections 112, and the tactile perception of the relief impressions 112 replacing the indented impressions 12 of the preceding example are provided in the same way. The relief impressions 112 may even be formed as projections similar to those of the Braille alphabet which are perceivable by persons without sight, who may even, because of their characteristic tactile sensitivity, read the graduations corresponding to the impressions 112. The stem 109 as shown in FIG. 5, can have two flat surfaces. One flat surface can have the silk-screened part of the visual scale as previously described, and shown in FIG. 1. The other flat surface can have the impressions 112, especially in the form of Braille characters.

In the solution shown in FIG. 1, the quantity of liquid to be dispensed is determined during the suction phase. The person without sight determines the number of clicks, and therefore of drops to be dispensed, according to a tactile or even an auditory perception. In the solution shown in FIG. 3, however, the person without sigh can determine the dosage in the aspiration phase as in FIG. 1; alternatively, he can pull out the piston completely in such a way as to fill the whole cylinder 5, after which (using the manual sensitivity of persons without sight) he can determine, by sliding from the top toward the bottom (FIG. 3), the number of Braille projections and consequently the drops to be dispensed. At this point, by grasping the stem and making it slide into the bottle, the sightless person expels the excess dosage from the cylinder, and determines, by means of his thumb bearing against the sleeve 3A, the desired volume of liquid to be dispensed. This last system is simple and requires no elastic tongue. In this way a more complex construction is avoided.

It is to be understood that the drawing shows only an example provided solely as a practical demonstration of the invention, this invention being variable in its forms and arrangements without departure from the scope of the guiding concept of the invention. The presence of any reference numbers in the attached claims has the purpose of facilitating the reading of the claims with reference to the description and to the drawing, and does not limit the scope of the protection represented by the claims.

What is claimed is:

1. Device for drawing and dispensing liquid from a bottle with a cylinder and piston assembly associated with a stopper of the bottle, characterized in that a stem of a piston of the assembly has a series of impressions in relief or indented form, said impressions are shaped with Braille characters perceptible by touch and which permit tactile perception of a position of the piston with respect to a cylinder of the assembly even by persons without sight, said impressions interact with a plurality of elastic tongues formed in the stopper and distributed around the stem of the piston, the elastic tongues being formed in an extension formed by the stopper and surrounding the stem of the piston.

2. Device according to claim 1, characterized in that the piston is formed by molding from the same material as the stem, and can be inserted through a funnel-shaped area and the elastic tongues, the operator's end of the piston stem being developed with an expansion for operation.

3. Device according to claim 2, characterized in that the end of the stem, beyond the piston, has an extension forming a valve capable of interacting with a seat formed for it in the base of the cylinder, to seal the seat when the bottle is in the closed condition, said extension being spaced from said piston by an amount to leave a gap between said seat as closed with said extension and said piston.

4. A device in accordance with claim 1, wherein:
said stem has a flat surface with a visual scale.

5. A device in accordance with claim 4, wherein:
said stem has another flat surface with said Braille characters.

6. A device in accordance with claim 1, wherein:
said stem has a flat surface with said Braille characters.

7. A bottle dispensing device comprising:

a stopper connectable to a bottle;

a cylinder and piston connected to said stopper, said cylinder defining a hole at one end of said cylinder, said piston including an extension moveable toward said hole of said cylinder to close said hole, said extension being spaced from said piston by an amount to leave a gap between said hole as closed with said extension and said piston;

a stem connected to said piston and moveable with said piston, said stem having a plurality of impressions shaped as Braille characters in one of relief and indented form, said impressions being arranged on said stem for, and having a size for, tactile perception of a position of said piston with respect to said cylinder.

8. A device in accordance with claim 7, further comprising:

a plurality of elastic tongues arranged on said stopper and around said stem, said plurality of tongues interacting with said plurality of impressions to provide an auditory perception of said position of said piston.

9. A device in accordance with claim 7, wherein:
said stem has a flat surface with a visual scale.

10. A device in accordance with claim 9, wherein:
said stem has another flat surface with said Braille characters.

11. A device in accordance with claim 7, wherein:
said stem has a flat surface with said Braille characters.

\* \* \* \* \*